United States Patent
Neulist et al.

(10) Patent No.: US 7,245,589 B2
(45) Date of Patent: Jul. 17, 2007

(54) WIRELESS MEDIA GATEWAY WITH BEARER PATH CONTROL AND TONE ALLOCATION

(75) Inventors: Jakob J. Neulist, West Chicago, IL (US); Sikander Waheed, Lombard, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 957 days.

(21) Appl. No.: 10/419,609

(22) Filed: Apr. 21, 2003

(65) Prior Publication Data

US 2004/0208132 A1 Oct. 21, 2004

(51) Int. Cl.
*H04L 12/28* (2006.01)
(52) U.S. Cl. .................. 370/254; 370/252; 370/352; 370/238
(58) Field of Classification Search ................ 370/254, 370/392, 401, 329, 236, 252, 352, 238
See application file for complete search history.

(56) References Cited

U.S. PATENT DOCUMENTS

2004/0062271 A1* 4/2004 Oliver et al. ............... 370/466
2004/0095923 A1* 5/2004 Ejzak et al. ................ 370/352

* cited by examiner

*Primary Examiner*—Dang T. Ton
*Assistant Examiner*—Ken Hartmann

(57) ABSTRACT

A method is provided for operating a media gateway in a telecommunications system. The gateway provides bearer paths for communication traffic between network segments via contexts. Each context includes a collection of terminations that link the gateway to the network segments and a topology that defines the bearer paths between the terminations within the context. The method includes: receiving a new topology for one of the contexts within the gateway, comparing the received topology to a current topology for the context, based upon the foregoing comparison, determining which terminations within the context are to be disconnected from one another; disconnecting terminations within the context from on&another in accordance with the foregoing determination; comparing the received topology to the current topology for the context; based on the foregoing comparison, determining which terminations within the context are to be connected to one another; and, connecting terminations within the context to one another in accordance with the foregoing determination.

18 Claims, 4 Drawing Sheets

WIRELESS MEDIA GATEWAY WITH BEARER PATH CONTROL AND TONE ALLOCATION

FIELD

The present invention relates to the art of telecommunications. It finds particular application in conjunction with wireless multimedia communications transported over a packet data network (PDN), i.e., such as the Internet or other packet switched network, and will be described with particular reference thereto. However, it is to be appreciated that the present invention is also amenable to other like applications and suited to other similar communication networks or environments.

BACKGROUND

As are generally known in the telecommunications field, gateways are points of entrance to and exit from a communications network. Viewed as a physical entity, a gateway is that node that translates between two otherwise incompatible networks or network segments. Typically, gateways perform code and protocol conversion to facilitate traffic between data paths of differing architecture. A wireless media gateway (WMG) facilitates the flow of traffic between what is commonly known as a radio access network (RAN) and a PDN and/or a public switched telephone network (PSTN).

The RAN performs the radio functionality of a mobile network and often provides a connection to a core network (CN) that includes infrastructure for integrating circuit and packet switched traffic. The RAN typically includes a radio network controller (RNC) which carries traffic to/from the RAN, e.g., in an asynchronous transfer mode (ATM). For routing this traffic over the PDN, the WMG which is typically part of the CN is responsible for converting or transcoding the ATM traffic into a real-time transport protocol (RTP), user datagram protocol (UDP), Internet protocol (IP) or other protocol that is appropriate for the PDN.

While generally adequate for their purposes, many previously developed WMGs are limited in certain respects. In some instances, for example, previously developed WMGs can handle no more than two terminations per context, and/or may not support topology operation. Furthermore, the provisioning of tones (e.g., ring tones, hold tones, etc.) in some previously developed WMGs results in relatively inefficient use of resources as compared to the approach of the present application. That is to say, with some previously developed WMGs, a separate tone source channel is allocated to each call session for the duration the tone is being provided. Accordingly, terminations that could otherwise be used for bearer traffic are encumbered to provide the tones from the separate tone source channels.

The present invention contemplates a new and improved WMG and/or technique for operation of the same that overcomes the above-referenced problems and others.

SUMMARY

In accordance with an aspect of the present invention, a method is provided for operating a media gateway in a telecommunications system. The gateway provides bearer paths for communication traffic between network segments via contexts. Each context includes a collection of terminations that link the gateway to the network segments and a topology that defines the bearer paths between the terminations within the context. The method includes: (a) receiving a new topology for one of the contexts within the gateway, the received topology defining a desired pattern of bearer paths between the terminations included in the context; (b) comparing the received topology to a current topology for the context, the current topology defining a currently existing pattern of bearer paths between the terminations included in the context; (c) based upon the comparison of step (b), determining which terminations within the context are to be disconnected from one another; (d) disconnecting terminations within the context from one another in accordance with the determination of step (c); (e) comparing the received topology to the current topology for the context; (f) based on the comparison of step (e), determining which terminations within the context are to be connected to one another; and, (g) connecting terminations within the context to one another in accordance with the determination of step (f).

In accordance with another aspect of the present invention, a controller is provided for a media gateway operative in a telecommunications system to provide bearer paths for communication traffic between network segments via contexts. Each context includes a collection of terminations that link the gateway to the network segments and a topology that defines the bearer paths between the terminations within the context. The controller includes: receiving means for receiving a new topology for a context within the gateway, the received topology defining a desired pattern of bearer paths between the terminations included in the context; comparing means for making comparisons between the received topology to a current topology for the context, the current topology defining a currently existing pattern of bearer paths between the terminations included in the context; determination means for making determinations as to which terminations within the context are to be disconnected from one another and which are to be connected to one another based upon comparisons made by the comparing means; disconnecting means for disconnecting terminations within the context from one another in accordance with determinations made by the determination means; and, connecting means for connecting terminations within the context to one another in accordance with determinations made by the determination means.

In accordance with yet another aspect of the present invention, an apparatus is provided for interconnecting network segments of a telecommunication network together so as to provide for the flow of communication traffic therebetween. The apparatus includes a media gateway that provides bearer paths for the communication traffic via contexts. Each context includes a collection of terminations that link the media gateway to the network segments and a topology that defines the bearer paths between the terminations within the context. Also included in the apparatus is a media gateway controller that controls the media gateway by: receiving a new topology for one of the contexts within the media gateway, the received topology defining a desired pattern of bearer paths between the terminations included in the context; making a first comparison of the received topology to a current topology for the context, the current topology defining a currently existing pattern of bearer paths between the terminations included in the context; based upon the first comparison, determining which terminations within the context are to be disconnected from one another and signaling the media gateway to disconnect the same; updating the current topology to reflect disconnections of terminations made by the media gateway; making a second comparison the received topology to the updated current topology for the context; and, based on the second comparison, determining which terminations within the context are to be connected to one another and signaling the media gateway to connect the same.

Numerous advantages and benefits of the present invention will become apparent to those of ordinary skill in the art upon reading and understanding the present specification.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention. Further, it is to be appreciated that the drawings are not to scale.

DETAILED DESCRIPTION OF PREFERRED EMBODIMENTS

Figure 1:
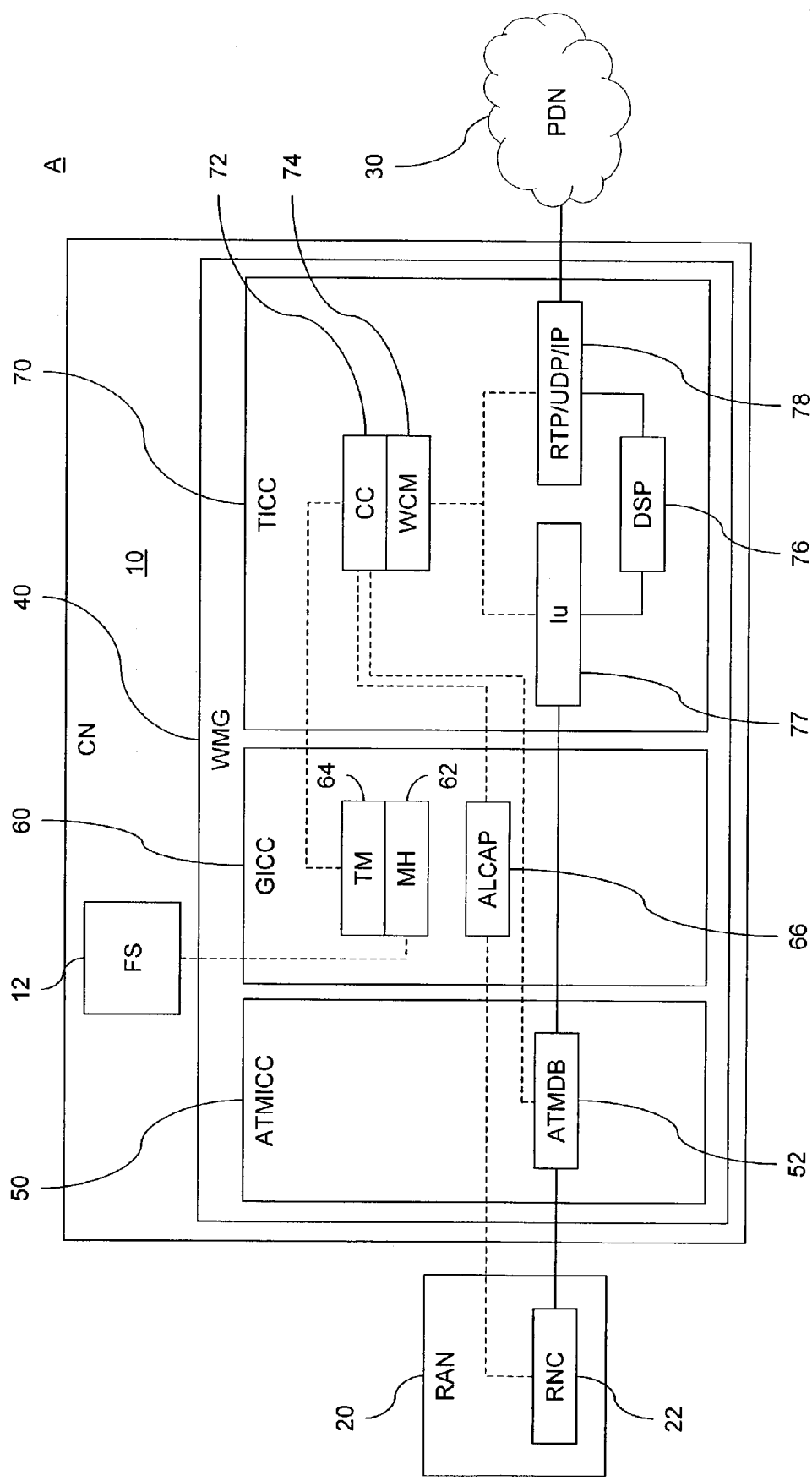
FIG. 1 is a block diagram showing a telecommunications network employing an exemplary WMG in accordance with aspect of the present invention.

For simplicity and ease of reference, the following acronyms shall be used in the present specification to refer to structural and/or functional network elements and/or entities, relevant telecommunications standards, protocols, services, terminology, etc., as they are commonly known in the telecommunications art, except to the extent they have been modified in accordance with aspects of the present invention:

3GPP—3rd Generation Partnership Project
3GPP2—3GPP 2
AAL2—ATM Adaptation Layer 2
AAL5—ATM Adaptation Layer 5
ALCAP—Access Link Control Application Part
ARM—Adaptive Multi Rate
ATM—Asynchronous Transfer Mode
ATMDB—ATM Distributor
ATMICC—ATM ICC
CC—Context Control
CID—Cell Identity
CN—Core Network
DSP—Digital Signal Processor
FS—Feature Server
GICC—Global ICC
ICC—Integrated Circuit Card
IP—Internet Protocol
MGCF—Media Gateway Control Function
MH—Message Handler
PCM—Pulse Code Modulation
PDN—Packet Data Network
PSTN—Public Switched Telephone Network
RAN—Radio Access Network
RNC—Radio Network Controller
RTP—Real-time Transport Protocol
SAP—Service Access Point
SCN—Switched Circuit Network
TDM—Time Division Multiplex
TICC—Transcoder ICC
TM—Transcoder Manager
TS—Tone Source
UDP—User Datagram Protocol
VCI—Virtual Channel Identifier
VFSM—Virtual Finite State Machine
VPI—Virtual Path Identifier
WCM —WMG Connection Manager
WMG—Wireless Media Gateway With reference to FIG. 1, an optionally 3GPP/3GPP2 compliant telecommunications environment A is equipped and/or arranged to manage and/or route multimedia communications between end user terminals employing the same. Other suitable telecommunications environments, however, may be employed. As shown, a CN 10 includes a WMG 40 and other infrastructure for bridging and/or integrating circuit and packet switched traffic. More specifically, the flow of traffic between a RAN 20 and a PDN 30 is facilitated by the WMG 40. The RAN 20 includes a RNC 22 that suitably carries ATM traffic to and/or from the RAN 20. For routing this traffic over the PDN 30, the WMG 40 is responsible for converting or transcoding the ATM traffic into an RTP, UDP, IP or other protocol that is appropriate for the PDN 30.

Bearer paths that carry and/or relay the communication traffic, payload and/or user information intended to be transmitted from one terminal to another are shown as solid lines in FIG. 1. Control paths carry and/or relay associated signaling and/or control commands or messages to and between appropriate network elements and/or entities such that call sessions are properly managed and routed. The control paths are shown as dashed lines in FIG. 1. Suitably, H.248 and/or other appropriate known protocols are used on the control paths.

As shown in FIG. 1, the WMG 40 is physically divided into a plurality of ICCs including ATMICC 50, GICC 60 and TICC 70. While FIG. 1 shows only one of each for simplicity and clarity herein, it is to be appreciated that suitably, the WMG 40 includes a pair of ATMICCs (one active and one standby), a pair of GICCs (one primary and one secondary) and a plurality of TICCs, e.g., 8–10. Suitably, the GICC 60 is used for control while the TICC 70 and ATMICC 50 provide the bearer paths for end user traffic and support control paths for signaling exchanged between the various network elements and/or entities.

The ATMICC 50 acts as a bear path entry/exit point for ATM traffic from/to the RNC 22, and incorporates an ATMDB 52 that provides bearer distribution, e.g., via AAL2 CID switching. That is to say, the ATMICC 50 provide AAL2 bearer termination and AAL5 signaling termination. The ATMDB 52 provides a path control function that programs an AAL2 CID switch to distribute bearer traffic coming from the RNC 22 to the appropriate TICC 70. Further, a control link is provided between the ATMDB 52 and a CC 72 on the TICC 70 for setting up the CID switch.

The GICC 60 incorporates global resources for the WMG 40. The primary function of the GICC 60 is to serve as the control path entry point for control signaling from a FS 12 that administers operation of the WMG 40, e.g., via the H.248 protocol. Incoming H.248 control messages are distributed to the associated TICCs 70 handling the call sessions to which the messages relate. Suitably, a MH 62, TM 64 and ALCAP application 66 reside on the GICC 60. The MH 62 is responsible for the parsing of H.248 messages and converting them into an equivalent structure to be used by the CC 72 on the TICC 70. The MH 62 does basic H.248 protocol termination. Via the TM 64, the MH 62 then hands off the H.248 action to the CC 72 for call processing applications. That is to say, the parsed messages will be handed off to the TM 64 that is responsible for allocation of transcoder resources and selection of the proper TICC 70 to be used by the MH 62 when routing H.248 messages to the CC 72. The ALCAP application 66 terminates the ALCAP protocol and sends control messages to the CC 72. These control messages provide the VPI, VCI, and CID established for the call session interface with the RNC 22.

The FS 12 is the primary signaling entity for call session control and is responsible for initiating and establishing call sessions over the CN 10. It provides H.248 protocol messages to the WMG 40 to thereby regulate the bearer paths within the WMG 40. The FS 12 supports and controls multimedia sessions through the establishment and maintenance of bearer paths for call sessions, e.g., by regulating the addition, modification and/or deletion of appropriate bearer paths for respective call sessions, providing features and services, and coordinating with other network elements for session control, service control and resource allocation.

The MGW 40 acts as a bearer path interface between the CN 10 and externals networks and/or subsystems, and provides translation resources and resources for modifying the bearer stream (e.g., encoding, transcoding, compression, packetization, depacketization, etc.). It interacts with the FS 12 (which interprets call signaling and controls the MGW 40 accordingly) in order to achieve resource allocation, bearer path control, and payload processing.

The TICC 70 incorporates the CC 72 and a WCM 74. The CC 72 is the main state machine that controls a call related H.248 context setup. It drives the actions of a DSP 76. The CC 72 is externally controlled by the FS 12 and RNC 22 via the MH 62 and the ALCAP application 66, respectively. The DSP 76 does the transcoding within the bearer path. From the ATMICC side, the bearer traffic links to the TICC 70 via lu interface 77. Suitably, AAL2 is employed between the ATMDB 52 and the lu interface 77, and AAL5 between the lu interface 77 and the DSP 76. At the lu interface 77, protocol processing is performed and then AMR information is forward to the DSP 76. The DSP 76 converts the AMR stream into a PCM stream, or vice versa for traffic flowing in the opposite direction. The PCM stream is encapsulated in RTP/UDP/IP at the opposing interface 78 linking the WMG 40 with the PDN 30. Suitably, the lu interface 77 is the module in the bearer path responsible for extraction and processing of lu control commands from the RNC 22.

Suitably, the WCM 74 controls the SAP connections established between the ATMICC 50 and TICC 70. If a connection is lost it is responsible for receiving notification of the same and reestablishing the connections when the appropriate resources become available again.

Figure 2:
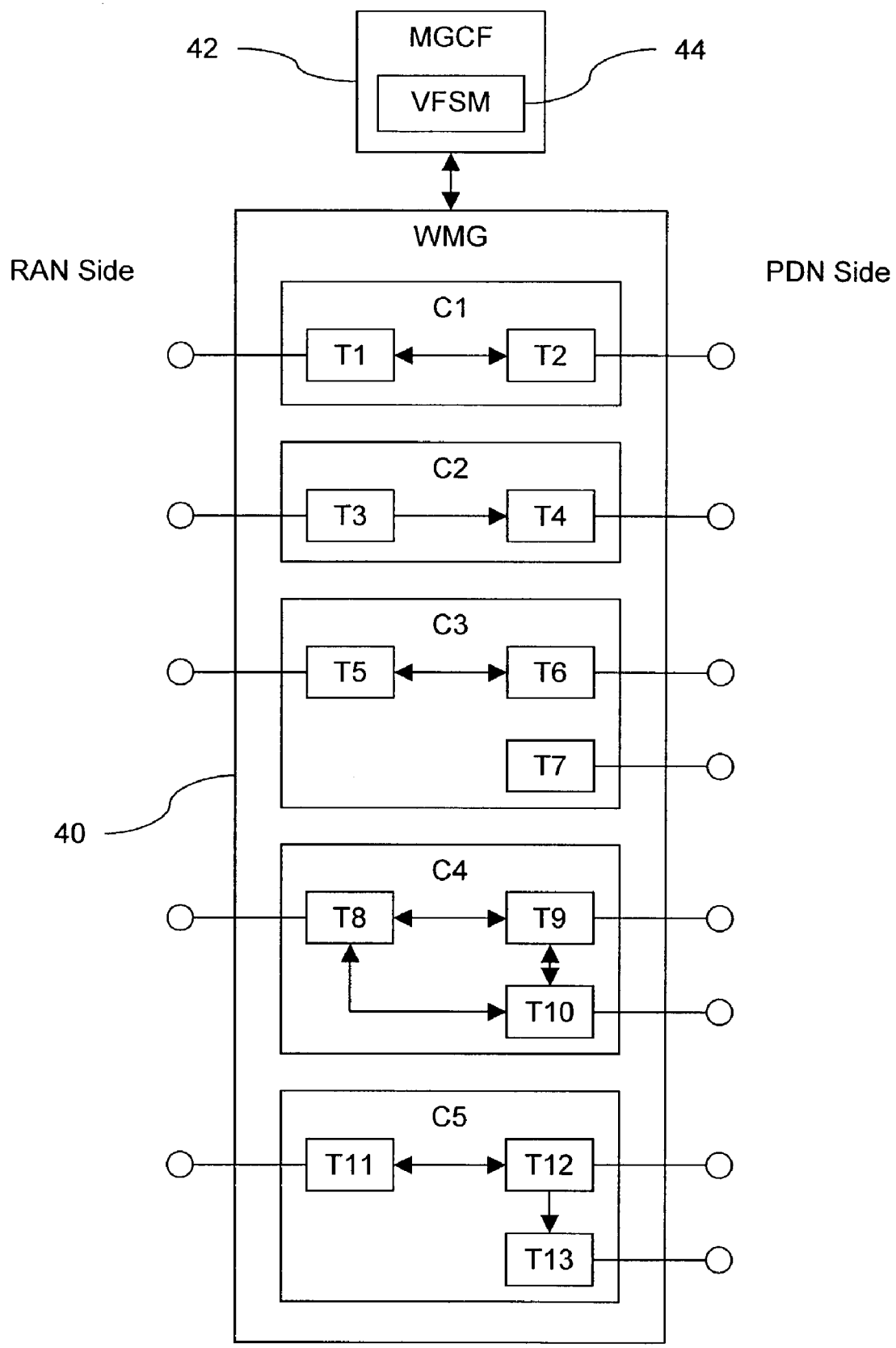
FIG. 2 is a block diagram showing an exemplary connection model used by a WMG in accordance with aspect of the present invention.

With reference to FIG. 2, a connection model describes logical entities, or objects, within the WMG 40. The main abstractions used in the connection model include what are known as terminations (T1, T2, T3, . . . , Tn) and contexts (C1, C2, C3, . . . , Cn). Terminations are logical entities representing physical endpoints (i.e., interfaces 77 and 78). Each termination sources and/or sinks one or more streams. The media stream parameters, bearer parameters, etc. are encapsulated within the termination. The context describes an association between a collection of terminations and is suitably represented as a star configuration (i.e., a variable number of interconnected nodes) of terminations. The context configuration reflects the logical association between the terminations belonging to that context. Suitably, each context contains one or more termination. FIG. 2 is a graphical depiction of these concepts. It gives several examples and is not meant to be all-inclusive. The arrows (or lack thereof) between terminations in each of the contexts represents the logical association of terminations implied by the context. As shown: C1 represents a both-way call session between T1 and T2; C2 represents a one-way call session between T3 and T4, with traffic flowing from T3 to T4; C3 represents a both-way call session between T5 and T6, with T7 being isolated, e.g., the call from T7 may be on hold or "call waiting" for T5 or T6; C4 represents a both-way conference call session between T8, T9, and T10; and, C5 represents a both-way call session between T1 and T12, with a one-way call session from T12 to T13, e.g., T13 may be "listening in" to the traffic from T12.

As stated, each context is an association between a number of terminations. The context describes a topology (i.e., which terminations receive and/or send traffic from other terminations in the context) and the media mixing and/or switching parameters if more than two terminations are involved in the association. The attributes of each context include: a context identifier (ID), and the topology of the context that describes the flow of media between the terminations within the context. The contexts are established, managed and/or regulated by the WMG 40 under the control of a MGCF 42, e.g., to add terminations to contexts, to remove terminations from contexts, to move terminations one context to another, and to define and/or change the topology within a context.

The terminations are described by a number of characterizing properties, e.g., address, media parameters, security properties, the events that can be generated by the termination, and signals that can be applied to it. Each termination has a unique identifier, i.e., termination ID, by which they are referenced. A wildcarding mechanism is optionally used to reference terminations, e.g., to address multiple terminations at once, and/or to indicate selection of a termination satisfying a partially specified termination ID. The effect of using a wildcard is identical to repeating a command with each of the matching termination IDs.

Suitably, a set of commands is provided for manipulating the logical entities of the connection model, i.e., the contexts and terminations. For example, commands exist to add terminations to a context, modify terminations, subtract terminations from a context, and audit properties of contexts and/or terminations. These commands provide for the control of the properties of contexts and terminations. This includes specifying which events a termination is to report, which signals/actions are to be applied to a termination and specifying the topology of a context. Most of these commands are for the specific use of the MGCF 42 as the command initiator in controlling the WMG 40 as the command responder. The exception is a Notify command that is sent from WMG 40 to MGCF 42. Exemplary commands include but are not limited to: an Add commands, Modify command, Subtract command, Move command, and the Notify command. The Add command adds a termination to a context. The Add command on the first termination in a context is used to create a context. The Modify command modifies the properties, events and signals of a termination. The Subtract command disconnects a termination from its context. The Subtract command on the last termination in a context deletes the context. The Move command atomically moves a termination to another context. The Notify command allows the WMG 40 to inform the MGCF 42 of the occurrence of events in the WMG 40.

Suitably, a topology descriptor is used to specify flow directions between terminations in a context. Suitably, the default topology of a context is that each termination's transmission is received by all other terminations (i.e., both-way). The topology descriptor consists of a sequence of triples of the form (Tn, Tm, association). Tn and Tm specify terminations within the context, possibly using a wildcard. The association specifies how media flows between these two terminations as follows:

- (Tn, Tm, isolate) means that the terminations matching Tm do not receive media from the terminations matching Tn, nor vice versa;
- (Tn, Tm, one-way) means that the terminations that match Tm receive media from the terminations matching Tn, but not vice versa; and,
- (Tn, Tm, both-way) means that the terminations matching Tm receive media from the terminations matching Tn, and vice versa.

If a termination is not mentioned within a topology descriptor, any topology associated with it remains unchanged. If, however, a new termination is added into a context its association with the other terminations within the context reflects the default (e.g., both-way), unless a topology descriptor is given to change this. For example, if T3 is added to a context having terminations T1 and T2 with the topology (T3, T1, one-way), T3 will be connected one-way to T1 and both-ways to T2.

Suitably, the MGCF 42 controlling the WMG 40 implements an event driven topology processing state machine, such as a VFSM 44, to establish, change and tear down bearer paths based on changes to the topology descriptor and other commands. The VFSM 44 handles a plurality of terminations and supports a queue to store commands for sequential execution. The VFSM 44 takes a parsed H.248 command as input and translates it into a list of termination connect, disconnect and other control signal primitives. These primitive are relayed to the WMG 40 for execution and the VFSM 44 monitors the WMG 40 for completion events from respective resources (i.e., DSP 76, interfaces 77 and 78, etc.). Each completion event advances the VFSM 44. When all the commands are complete a parsed H.248 acknowledgement is generated as output.

Figure 3:
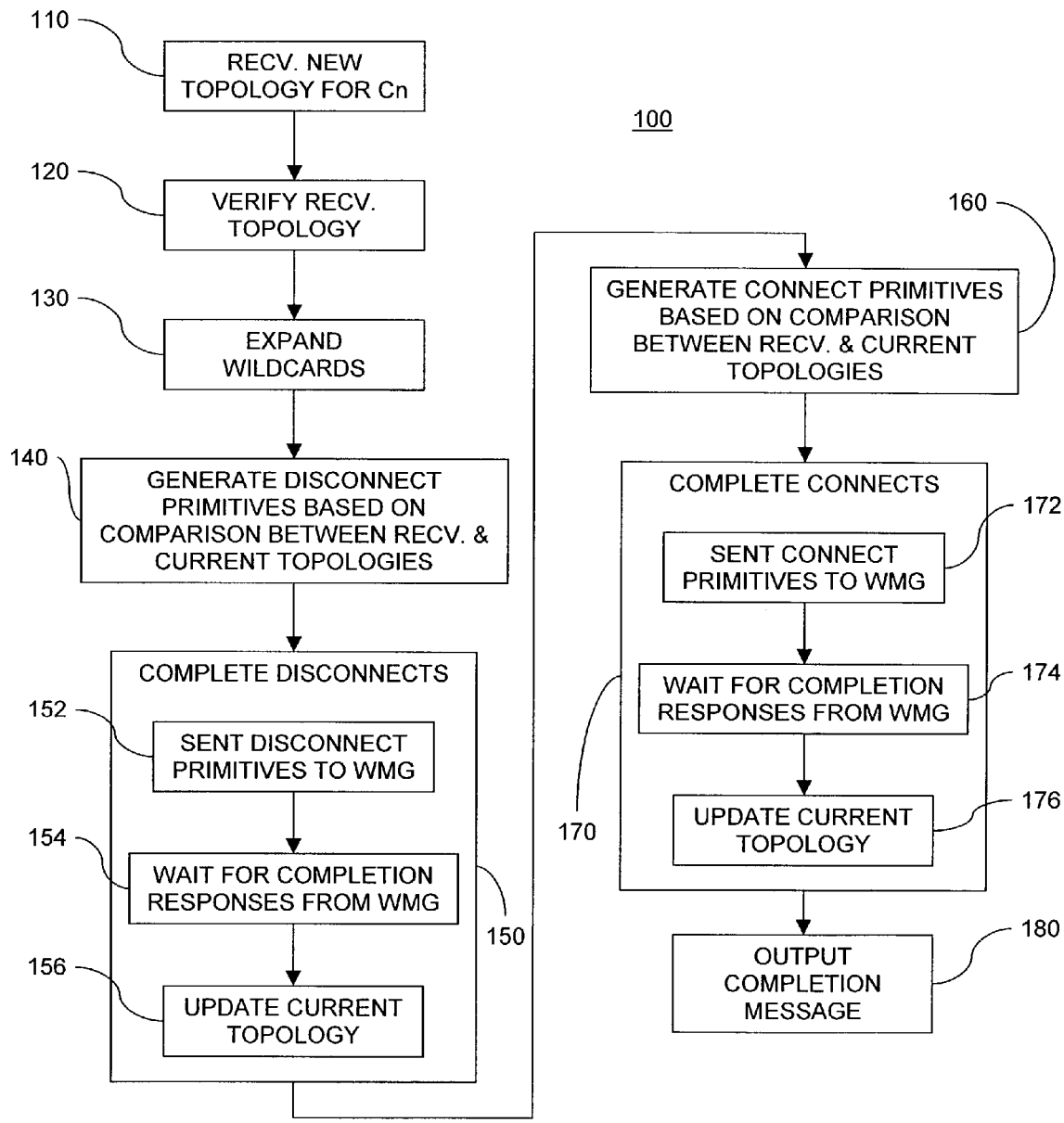
FIG. 3 is a flow chart showing an exemplary method of operating a WMG in accordance with aspect of the present invention.

With reference to FIG. 3, the flow chart illustrates an exemplary process 100 in which the topology of an arbitrary context Cn is changed or modified under the control of the VFSM 44. The process 100 begins at step 110 with the VFSM 44 receiving an input message containing a new topology, including one or more topology descriptors referencing Cn within the WMG 40. At step 120, the received topology is checked by the VFSM 44 to determine if the new topology indicated is valid for Cn. If invalid, an error message is returned, otherwise if valid, the process 100 continues to step 130 where any wildcards within the new topology are expanded. For example, a topology descriptor including a triplet in the form (Tn, WC, assoc_X), where Tn represents an arbitrary termination, WC represents a wildcard matching the terminations T1, T2 and T3, and assoc_X represents an arbitrary association, is expanded to (Tn, T1, assoc_X), (Tn, T2, assoc_X) and (Tn, T3, assoc_X).

Figure 4:
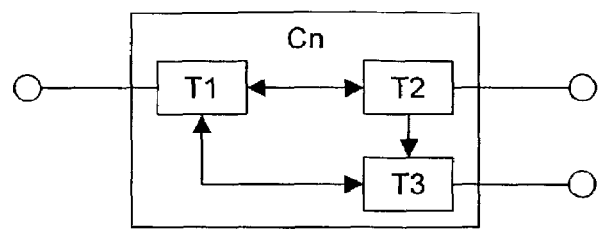
FIGS. 4 and 5 are block diagrams showing exemplary contexts for the purposes of explain aspects of the present invention.

Next, at step 140, the VFSM 44 compares the new topology to the current topology to determine the disconnect primitives to generate. The disconnect primitives are control signals relayed to the WMG 40 resulting in the disconnection of terminations. For example, consider Cn having a current topology as depicted in FIG. 4 being modified to have the new topology shown in FIG. 5. To achieve this modification, the new topology received by the VFSM 44 would include the two topology descriptors (T3, T1, isolate) and (T3, T2, isolate). Accordingly, at step 140, the VFSM 44 generates: a disconnect primitive that when relayed to the WMG 40 results in T3 being disconnected from T1; and, a disconnect primitive that when relayed to the WMG 40 results in T3 being disconnected from T2. Of course, rather than using the forgoing two topology descriptors, a single topology descriptor such as (T3, WC, isolate) in the new topology would achieve the same result, where WC represents a wildcard matching both T1 and T2.

At step 150, the disconnects are carried out in accordance with the generated disconnect primitives. More specifically, at sub-step 152, the disconnect primitives are sent to the WMG 40. At sub-step 154, the VFSM 44 waits for responses from the WMG 40 indicating the completion of the disconnects, and at sub-step 156, the VFSM 44 updates the current topology to reflect the same. At this point, all the disconnects have been made and the current topology updated accordingly.

Figure 5:
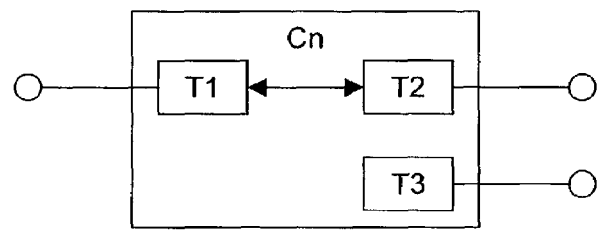

Next, at step 160, the VFSM 44 compares the new topology to the current topology (now reflecting the previously made disconnects) to determine the connect primitives to generate. The connect primitives are control signals relayed to the WMG 40 resulting in the specified connection of terminations, either one-way or both-way. For example, consider Cn having a current topology as depicted in FIG. 5 being modified to have the new topology shown in FIG. 4. To achieve this modification, the new topology received by the VFSM 44 would include the topology descriptors (T2, T3, one-way) and (T1, T3, both-way). Accordingly, at step 160, the VFSM 44 generates: a connect primitive that when relayed to the WMG 40 results in T2 being one-way connected to T3; and, a connect primitive that when relayed to the WMG 40 results in T1 being both-way connected to T3.

At step 170, the connects are carried out in accordance with the generated connect primitives. More specifically, at sub-step 172, the connect primitives are sent to the WMG 40. At sub-step 174, the VFSM 44 waits for responses from the WMG 40 indicating the completion of the connects, and at sub-step 176, the VFSM 44 again updates the current topology to reflect the same. At this point, the topology of Cn now reflects the new topology received by the VFSM 44.

Finally, at step 180, the VFSM 44 outputs an appropriate completion message responding to the input message containing the received topology, e.g., a parsed H.248 acknowledgement.

Figure 6:
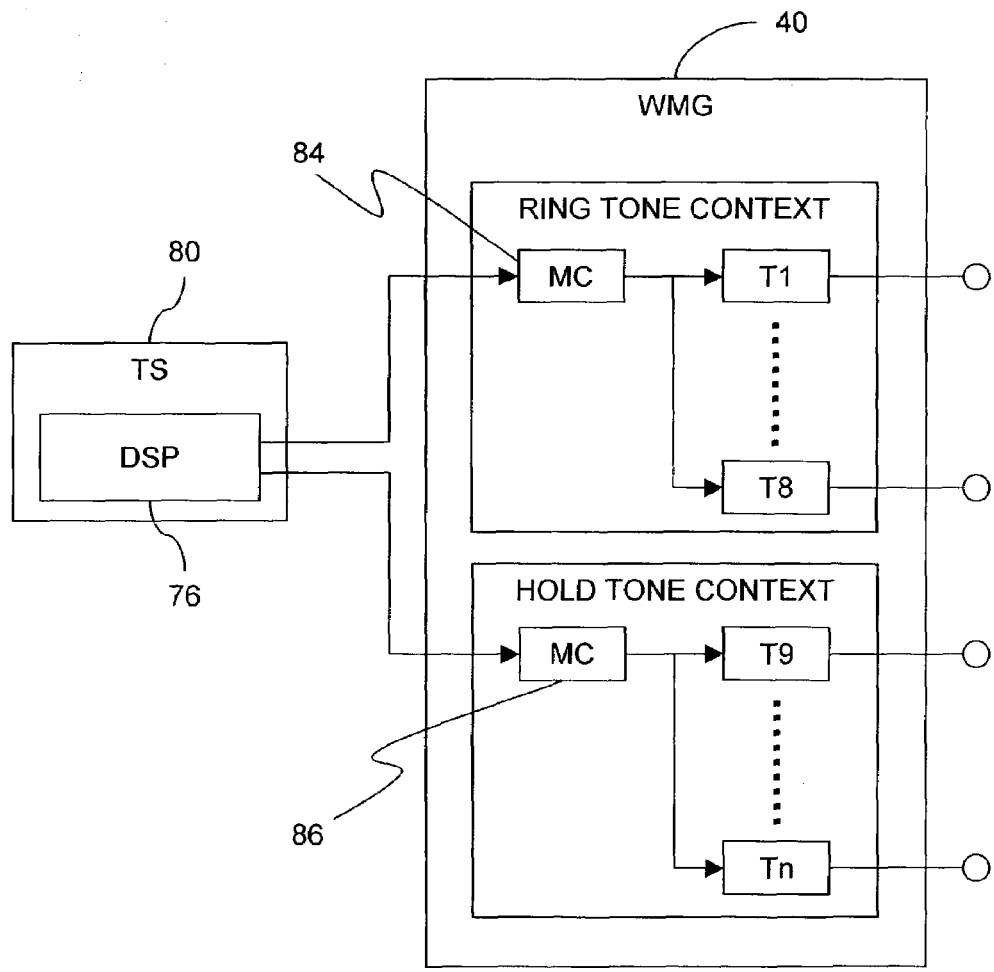
FIG. 6 is a block diagram of an exemplary WMG having a tone allocation feature in accordance with aspect of the present invention.

With reference to FIG. 6, the WMG 40 is optionally provisioned to deliver a tone (e.g., a ring tone, hold tone, etc.) to multiple calls using a designated termination as a multicast channel (MC). Suitably, the MC is permanently allocated to a TS 80, but once this is done any number of calls can apply the tones generated by the TS 80 for arbitrary periods during a call session. Generally, the number of call instances is far greater than the number of tone types thereby leading to a large reduction in tone source capacity utilization. Suitably, the DSP 76 is implemented by the TS 80 to generate the tones.

During initialization, MCs are allocated for each applicable tone type. A connection is nailed up between each MC and the TS 80 and the tones are initiated. The MC duplicates the tone packets to multiple calls depending on which calls are connected thereto at the time the tone is received from the TS 80. In order to use a tone, each termination linking a call that is to receive the tone is connected to the MC from which the respective tone is being transmitted. When the tone is no longer to be used, the termination is disconnected. Each collection of terminations receiving a particular tone type along with the MC supplying the tone effectively forms a separate context for that tone. As shown, e.g., a ring tone context is defined wherein a ring tone is being delivered from the TS 80 broadcast through MC 84 to terminations T1 through T8. Similarly, a hold tone context is defined wherein a hold tone is being delivered from the TS 80 broadcast through MC 86 to terminations T9 through Tn. Of course, there may be more or less such contexts depending on the number of different tone type generated by the TS 80, and they may be applied to more or less terminations depending on the number of calls that are to receive the particular tone type.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively mixed and matched as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the invention has been described with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method of operating a media gateway in a telecommunications system, said gateway providing bearer paths for communication traffic between network segments via contexts, each context including a collection of terminations that link the gateway to the network segments and a topology that defines the bearer paths between the terminations within the context, the method comprising:
   (a) receiving a new topology for one of the contexts within the gateway, said received topology defining a desired pattern of bearer paths between the terminations included in the context;
   (b) comparing the received topology to a current topology for the context, said current topology defining a currently existing pattern of bearer paths between the terminations included in the context;
   (c) based upon the comparison of step (b), determining which terminations within the context are to be disconnected from one another;
   (d) disconnecting terminations within the context from one another in accordance with the determination of step (c);
   (e) comparing the received topology to the current topology for the context;
   (f) based on the comparison of step (e), determining which terminations within the context are to be connected to one another; and,
   (g) connecting terminations within the context to one another in accordance with the determination of step (f).

2. The method of claim 1, wherein step (d) includes:
   sending a control signal to the gateway, said control signal resulting in the disconnecting;
   waiting for a response from the gateway indicating that the disconnecting is complete; and,
   updating the current topology to reflect the completed disconnecting.

3. The method of claim 2, wherein step (g) includes:
   sending a control signal to the gateway, said control signal resulting in the connecting;
   waiting for a response from the gateway indicating that the connecting is complete; and,
   updating the current topology to reflect the completed connecting.

4. The method of claim 1, further comprising:
   verifying that the received topology is valid for the context.

5. The method of claim 1, wherein said received topology contains a topology descriptor having a form of a triplet including a first termination identifier specifying a first termination within the context, a second termination identifier specifying a second termination within the context and an association that describes the bear path between the first and second terminations within the context.

6. The method of claim 5, wherein the association is selected from a group consisting of one-way, both-way and isolate, the one-way association defining a bear path in which traffic flows one-way from the first termination to the second termination specified in the triplet, the both-way association defining a bear path in which traffic flows both-ways between the specified terminations in the triplet, and the isolate association defining absence of a bearer path between the specified terminations in the triplet.

7. The method of claim 6, wherein either of the first or second termination identifiers is replaced with a wildcard, said wildcard specifying a number of terminations that match the wildcard.

8. The method of claim 7, further comprising:
   expanding the wildcard such that the received topology includes separate topology descriptors for all the terminations within the context that match the wildcard.

9. The method of claim 1, further comprising:
   linking a call tone to a dedicated termination belonging to a designated context within the gateway; and,
   when other terminations in the gateway are to receive the call tone, moving said other terminations to the designated context and connecting them to the dedicated termination.

10. A controller for a media gateway operative in a telecommunications system to provide bearer paths for communication traffic between network segments via contexts, each context including a collection of terminations that link the gateway to the network segments and a topology that defines the bearer paths between the terminations within the context, said controller comprising:

receiving means for receiving a new topology for a context within the gateway, said received topology defining a desired pattern of bearer paths between the terminations included in the context;

comparing means for making comparisons between the received topology to a current topology for the context, said current topology defining a currently existing pattern of bearer paths between the terminations included in the context;

determination means for making determinations as to which terminations within the context are to be disconnected from one another and which are to be connected to one another based upon comparisons made by the comparing means;

disconnecting means for disconnecting terminations within the context from one another in accordance with determinations made by the determination means; and, connecting means for connecting terminations within the context to one another in accordance with determinations made by the determination means.

11. The controller of claim 10, further comprising:

updating means for updating the current topology to reflect changes made thereto resulting from the disconnecting means disconnecting terminations within the context and the connecting means connecting terminations within the context.

12. The controller of claim 11, wherein the determination means makes determinations as to which terminations within the context are to be disconnected from one another, the disconnecting means disconnects those termination from one another and the updating means updates the current topology prior to the determination means making determinations as to which terminations are to be connected to one another.

13. The controller of claim 12, wherein the controller is implemented as a virtual finite state machine.

14. The controller of claim 10, wherein the network segments joined by the gateway are a radio access network and a packet data network.

15. The controller of claim 10, further comprising:

means for moving selected terminations to a designated context and connecting them to a dedicated termination when said selected terminations are to receive a particular call tone, said call tone linked to the dedicated termination belonging to the designated context within the gateway.

16. An apparatus for interconnecting network segments of a telecommunication network together so as to provide for the flow of communication traffic therebetween, said apparatus comprising:

a media gateway that provides bearer paths for the communication traffic via contexts, each context including a collection of terminations that link the media gateway to the network segments and a topology that defines the bearer paths between the terminations within the context; and, a media gateway controller that controls the media gateway by:

receiving a new topology for one of the contexts within the media gateway, said received topology defining a desired pattern of bearer paths between the terminations included in the context;

making a first comparison of the received topology to a current topology for the context, said current topology defining a currently existing pattern of bearer paths between the terminations included in the context;

based upon the first comparison, determining which terminations within the context are to be disconnected from one another and signaling the media gateway to disconnect the same;

updating the current topology to reflect disconnections of terminations made by the media gateway;

making a second comparison the received topology to the updated current topology for the context; and, based on the second comparison, determining which terminations within the context are to be connected to one another and signaling the media gateway to connect the same.

17. The apparatus of claim 16, wherein the media gateway controller is a virtual finite state machine.

18. The apparatus of claim 16, wherein the media gateway further comprises:

a dedicated termination belonging to a designated context within the gateway, said dedicated termination being linked to a tone source that generates a call tone, such that when selected terminations in the gateway are to receive the call tone, said selected terminations are moved to the designated context and connected to the dedicated termination.

\* \* \* \* \*